(12) United States Patent
Tucker (10) Patent No.: US 7,504,947 B2
(45) Date of Patent: Mar. 17, 2009

(54) RFID TRANSMITTER FOR TIRES AND METHOD OF MANUFACTURE

(75) Inventor: Randall L. Tucker, Findlay, OH (US)

(73) Assignee: Cooper Tire & Rubber Company, Findlay, OH (US)

( * ) Notice: Subject to any disclaimer, the term of this patent is extended or adjusted under 35 U.S.C. 154(b) by 293 days.

(21) Appl. No.: 11/408,466

(22) Filed: Apr. 20, 2006

(65) Prior Publication Data

US 2006/0238356 A1 Oct. 26, 2006

Related U.S. Application Data

(60) Provisional application No. 60/674,935, filed on Apr. 26, 2005.

(51) Int. Cl.
G08B 13/14 (2006.01)
E01C 23/00 (2006.01)

(52) U.S. Cl. .................................................. 340/572.1

(58) Field of Classification Search .............. 340/572.1, 340/572.8, 447; 73/146; 343/873; 152/152
See application file for complete search history.

(56) References Cited

U.S. PATENT DOCUMENTS

| | | |
|---|---|---|
| 3,815,651 A | 6/1974 | Neal |
| 3,986,916 A | 10/1976 | Marangoni |
| 3,994,653 A | 11/1976 | Marangoni |
| 4,036,667 A | 7/1977 | Simon |
| 4,067,235 A | 1/1978 | Markland et al. |
| 4,074,227 A | 2/1978 | Kalmus |
| 4,160,234 A | 7/1979 | Karbo et al. |
| 4,695,823 A | 9/1987 | Vernon |
| 4,862,486 A | 8/1989 | Wing et al. |
| 4,911,217 A | 3/1990 | Dunn et al. |
| 5,011,379 A | 4/1991 | Hashimoto |
| 5,083,457 A | 1/1992 | Schultz |
| 5,218,861 A | 6/1993 | Brown et al. |
| 5,231,872 A | 8/1993 | Bowler et al. |
| 5,319,354 A | 6/1994 | Myatt |
| 5,346,663 A | 9/1994 | Sigenthaler |
| 5,348,067 A | 9/1994 | Myatt |
| 5,472,372 A | 12/1995 | Marangoni |
| 5,483,827 A | 1/1996 | Kulka et al. |
| 5,500,065 A | 3/1996 | Koch et al. |
| 5,505,080 A | 4/1996 | McGhee |

(Continued)

FOREIGN PATENT DOCUMENTS

GB WO2005022726 * 8/2004

OTHER PUBLICATIONS

GlobalSpec.com; Product category results for rfid chip.

(Continued)

Primary Examiner—Jeff Hofsass
Assistant Examiner—Sigmund Tang
(74) Attorney, Agent, or Firm—Emch, Schaffer, Schaub & Porcello Co., L.P.A.

(57) ABSTRACT

An RFID device is embedded in a precise location in tires during manufacture. The RFID device can provide extensive data regarding the tire such as identification number, date of manufacture and rotational count of the tire in use. During manufacture, the RFID device is placed on the carcass, the carcass is then positioned within the band layer and is thereafter expanded into sealing engagement with the band layer.

17 Claims, 6 Drawing Sheets

U.S. PATENT DOCUMENTS

| | | | |
|---|---|---|---|
| 5,540,092 A | | 7/1996 | Handfield et al. |
| 5,562,787 A | * | 10/1996 | Koch et al. .................... 156/64 |
| 5,573,610 A | * | 11/1996 | Koch et al. ............... 152/152.1 |
| 5,573,611 A | | 11/1996 | Koch et al. |
| 5,585,554 A | | 12/1996 | Handfield et al. |
| 5,694,111 A | | 12/1997 | Huang |
| 5,701,043 A | | 12/1997 | Razzaghi |
| 5,731,516 A | | 3/1998 | Handfield et al. |
| 5,731,750 A | | 3/1998 | Tatomir et al. |
| 5,731,751 A | | 3/1998 | Vangala |
| 5,731,754 A | | 3/1998 | Lee, Jr. et al. |
| 5,741,966 A | | 4/1998 | Handfield et al. |
| 5,781,104 A | | 7/1998 | Huang |
| 5,798,689 A | | 8/1998 | Huang |
| 5,825,283 A | | 10/1998 | Camhi |
| 5,825,286 A | | 10/1998 | Coulthard |
| 5,883,569 A | | 3/1999 | Kolefas |
| 5,969,608 A | | 10/1999 | Sojdehei et al. |
| 5,977,870 A | | 11/1999 | Rensel et al. |
| 6,028,525 A | | 2/2000 | Shukla et al. |
| 6,087,930 A | | 7/2000 | Kulka et al. |
| 6,147,659 A | | 11/2000 | Takahashi et al. |
| 6,204,765 B1 | | 3/2001 | Brady et al. |
| 6,208,244 B1 | | 3/2001 | Wilson et al. |
| 6,237,403 B1 | | 5/2001 | Oldenettel et al. |
| 6,257,289 B1 | | 7/2001 | Tomita et al. |
| 6,304,176 B1 | | 10/2001 | Discenzo |
| 6,437,558 B2 | | 8/2002 | Li et al. |
| 6,439,063 B1 | | 8/2002 | Schnackenberg |
| 6,441,731 B1 | | 8/2002 | Hess |
| 6,580,363 B1 | | 6/2003 | Wilson |
| 6,581,449 B1 | | 6/2003 | Brown et al. |
| 6,687,293 B1 | | 2/2004 | Loyer et al. |
| 6,693,541 B2 | | 2/2004 | Egbert |
| 6,700,567 B1 | | 3/2004 | Jaeger et al. |
| 6,700,931 B1 | | 3/2004 | Lee et al. |
| 6,705,365 B1 | | 3/2004 | Wilson |
| 6,725,713 B2 | | 4/2004 | Adamson et al. |
| 6,737,965 B2 | | 5/2004 | Okubo |
| 6,771,170 B2 | | 8/2004 | Papallo, Jr. et al. |
| 6,788,192 B2 | | 9/2004 | Shimura |
| 6,791,457 B2 | | 9/2004 | Shimura |
| 6,809,515 B1 | | 10/2004 | Li et al. |
| 6,809,516 B1 | | 10/2004 | Li et al. |
| 6,825,758 B1 | | 11/2004 | Laitsaari |
| 6,843,113 B2 | | 1/2005 | Lin |
| 6,856,245 B2 | | 2/2005 | Smith et al. |
| 6,885,291 B1 | | 4/2005 | Pollack et al. |
| 6,897,770 B2 | | 5/2005 | Lill |
| 6,899,153 B1 | | 5/2005 | Pollack et al. |
| 6,984,902 B1 | | 1/2006 | Huang et al. |
| 2002/0050744 A1 | | 5/2002 | Bernstein et al. |
| 2004/0191346 A1 | | 9/2004 | Marangoni et al. |
| 2005/0093539 A1 | * | 5/2005 | Salfelner ............... 324/207.25 |

OTHER PUBLICATIONS

Atmel; 13.56 MHz, 2048-bit RFID EEPROM; AT88RF020; Rev. 2010C-RFID Jun. 2006.
Lowry; Lowry RFID/EPC Supply Chain Solutions.
Lowry; RFID/EPC Solutions.
Wikipedia; RFID.
Trivalent Solutions, Inc.; [RFID].
microID™ 13.56 MHz RFID System Design Guide; Microchip; 1999 Microchip Technology, Inc.; Jul. 1999/DS21299C.
Atmel; 13.56 MHz, 2048-bit RFID EEPROM; AT88RF020; Feb. 2006.
Search Report and The Written Opinion Of The International Searching Authority; Aug. 27, 2007, for International Appln. PCT/US06/15120.

* cited by examiner

RFID TRANSMITTER FOR TIRES AND METHOD OF MANUFACTURE

CROSS REFERENCE TO RELATED APPLICATION

This application is based on and claims the benefit of provisional application No. 60/674,935 filed Apr. 26, 2005.

BACKGROUND OF THE INVENTION

In the manufacture and use of tires, it is desirable to know a definitive serial number of a tire to provide a means for the correlation of beneficial data and to gather data regarding the tires such as air pressure, wear and miles of travel.

FIELD OF THE INVENTION

The present invention relates to a Radio Frequency Identification Device (RFID). More particularly, the present invention relates to an RFID device permanently embedded in a tire during manufacture of the tire. The RFID device is used for identification and recording of mileage and other data in tires of all sizes. The RFID transmitter and additional components are cured directly into the tire to provide a tamper-proof system for permanent identification and is positioned at a fixed radial location in the tire. The fixed permanent radial location allows for accurate placement of the components and component splices during the assembly. It also provides for absolute radial positioning which is referenced in all additional assembly processes of the tire. Such absolute radial positioning of RFID devices in all tires produced in a run provides much improved quality and leads to improved quality inspections. The fixed radial reference location provides a means to locate a troublesome component, assembly technique or processes during the testing.

The RFID transmitter design provides for long-range transmission of the serial number that is utilized for the sorting and sequencing for additional processes.

The RFID device of the present invention is able to obtain an accurate count of the tire rotation through the use of a magnetic sensor which senses the earth's magnetic field. This sensor provides an input to a signal conditioner circuit, which provides an output to a counter circuit.

The present invention provides an electronic serial number for each tire manufactured. Such serial number may be accessed to determine the manufacture date, materials used, equipment used in manufacture and personnel involved with the assembly of such tires. It also provides beneficial design and warranty information.

In the assembly process, an RFID reader is attached to a tire building machine and electrically integrated to the machine control circuit. A directional antenna on the RFID reader provides a radial reference point on the tire, which establishes the location of components being added during the assembly. The directional RFID reader will be utilized in all the assembly and manufacturing processes to improve the quality of the tire.

Under the present invention, there is also provided a magnetic sensor to record the rotational count of a tire. This is accomplished by monitoring the output of the magnetic sensor through a comparator circuit and conditioning the signal. The circuit provides an output on a positive or negative leading or trailing edge of the signal, which indicates a rotation of the tire or sensor within the earth magnetic field. The system then records the counts (i.e. the number of rotations) which can then be accessed by reading the RFID data. One benefit of the RFID device is that it will provide an accurate mileage indication, which could be used for improving a tire design or warranty issues.

A benefit of the long-range transmission of the serial number of the tires is that it permits sorting and sequencing of the tires in subsequent processes of warehousing, sorting and shipping. The long-range transmission capability of the RFID device of the present invention provides for reading of skid-load quantities of tires in the warehousing and shipping operations.

Power to the RFID device may be obtained by a battery or an electromagnetic device for converting vibration or road noise encountered by the rotating tire/wheel into electrical energy. Prior art device which disclose apparatus for converting vibrating mechanical energy to electrical energy include international application PCT/US2004/003508 (International Publication Number WO 2005/022726 A1) including numerous devices disclosed therein and U.S. Pat. Nos. 5,741, 966, 6,725,713 and 6,825,758 all of which are incorporated herein by reference.

DETAILED DESCRIPTON OF THE INVENTION

Figure 1:
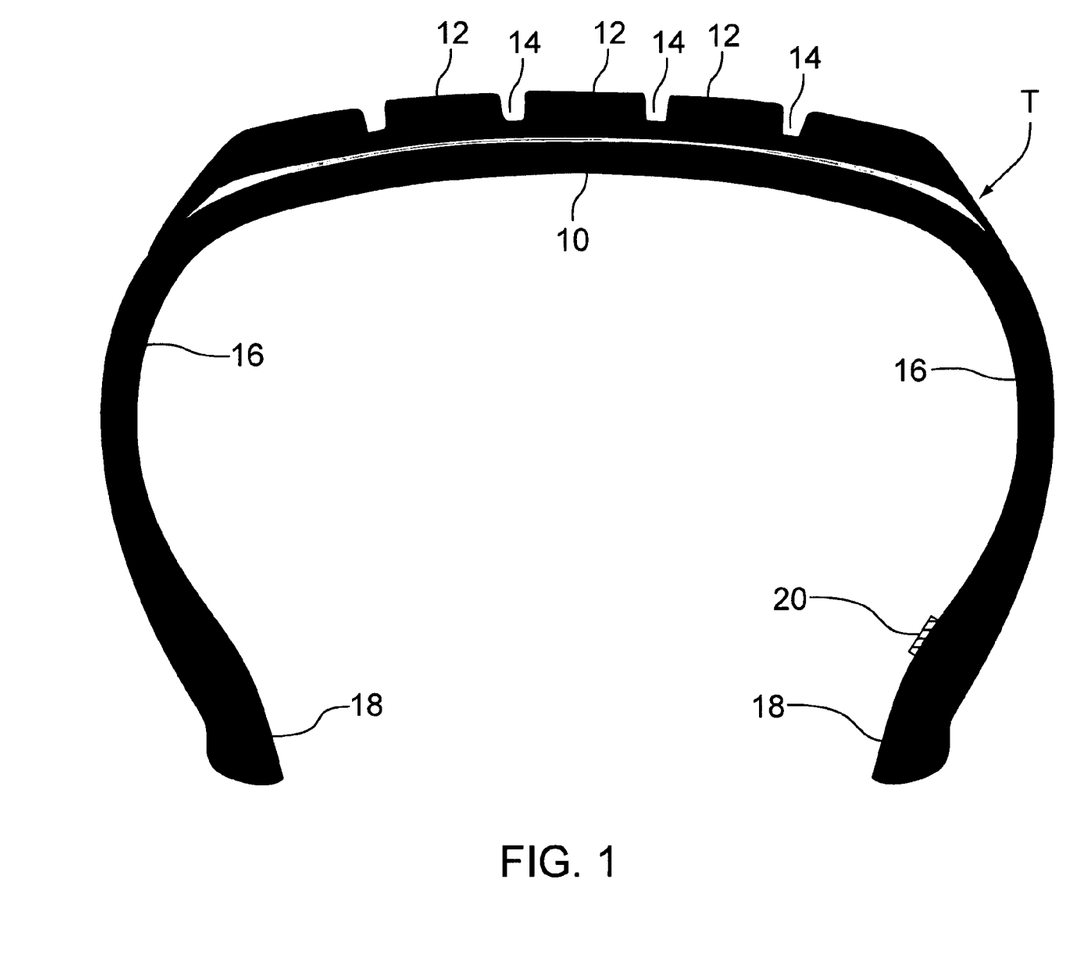
FIG. 1 is a cross-sectional view of a tire and the RFID device of the present invention attached to or encased in the sidewall thereof.

Referring to FIG. 1, there is shown a tire T having a crown 10 with external threads 12 and grooves 14. In cross-section, the tire T has the crown 10 extending radially outwardly along an arcuate path to pair of oppositely disposed sidewalls 16 which define the maximum radial extent of the tire T. The sidewalls 16 curve inwardly from such maximum radially extent to a narrower area terminating at a pair of oppositely disposed beads 18.

As shown in FIG. 1, there is provided an RFID device 20 of the present invention which is permanently imbedded in one of the sidewalls 16 in an area closer to the bead 18 than to the area of maximum radial extent of the sidewall 16. Although the selection of the precise location in the sidewall 16 for the RFID device 20 can be at any of a wide range of locations in the sidewall 16, it is important that once such location is established for a specific design and size of tire, that it remain the same for all subsequent production of the specific tire size and design. Thus, for a specific design and size tire, all RFID devices will be located at precisely the same location with respect to the RFID device itself it is also within the contemplation of the present invention that the RFID device 20 could be permanently secured to the interior surface of the sidewall 16, rather than embedded therein or on the rim or wheel to which the tire is affixed. With respect to the method of manufacture, it is within the contemplation of the invention that placement in the tires at precisely the same location for all tires of a specific design and size can apply to other types of information indicia devices, such as a magnetic or optical as well as RFID devices.

Figure 2:
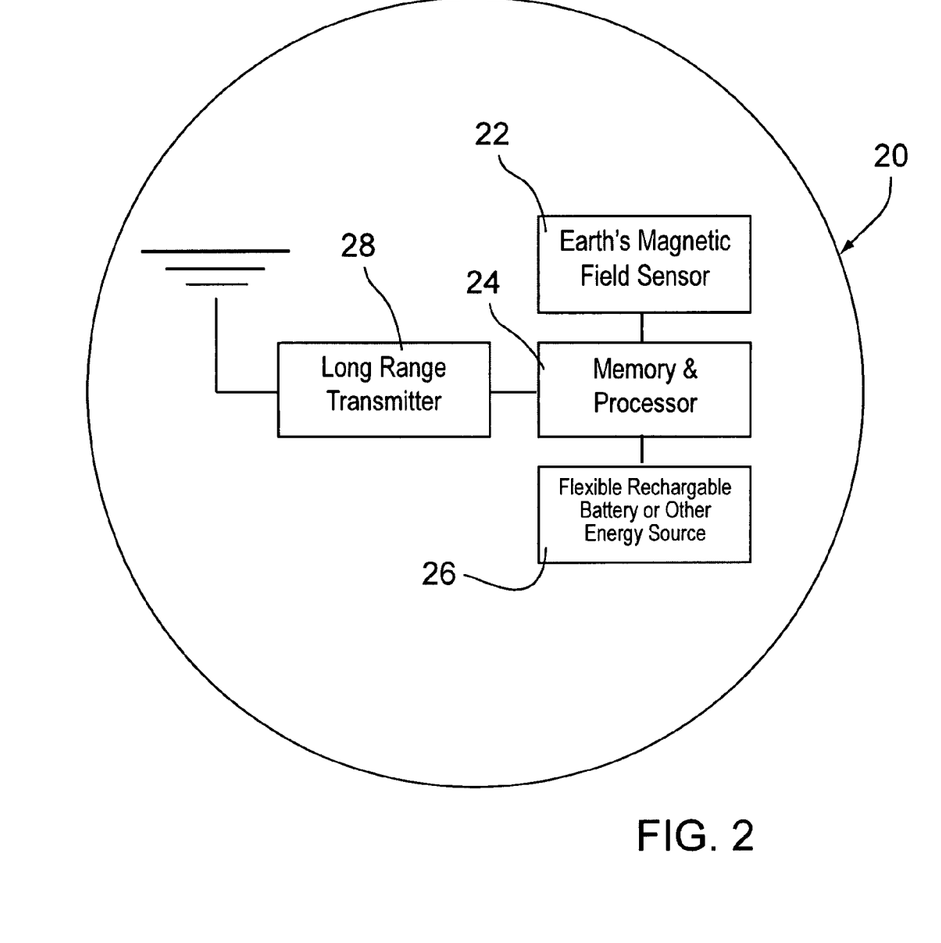
FIG. 2 is a block diagram of the various components of the RFID device of the present invention.

Referring to FIG. 2, there is shown schematically the construction of the RFID device 20 of the present invention. The device 20 includes a sensor 22 for sensing the earth's magnetic field, a microchip/memory processor 24, an energy source 26 and a long range transmitter 28. These elements are compactly assembled to form the RFID device 20 of the present invention. For example, with such components encapsulated, the RFID device has a diameter of approximately 0.75 inch.

The sensor 22 for sensing the earth's magnetic field and using such magnetic field sensing capability for determining the number of revolutions of a tire may be one manufactured by NVE Corporation, Eden Prairie, Minn. as a modification of its series AA or AH analog sensors. The microchip/memory processor 24 may be a microcontroller such as that manufactured by Microchip Technology Inc., Chandler Ariz. as its CMOS microcontroller model TIC12F629/675 which utilizes an 8-bit, 8-pin device as set forth in U.S. Pat. No. 5,847,450.

Examples of sensors which utilize the earth's magnetic field in their functioning may be found in U.S. Pat. Nos. 5,170,566 and 5,408,179 incorporated herein by reference.

The energy source 26 may be one of a number of electromagnetic devices for converting mechanical vibration to electrical energy including but not limited to those identified in the FIELD OF THE INVENTION.

Figure 3:
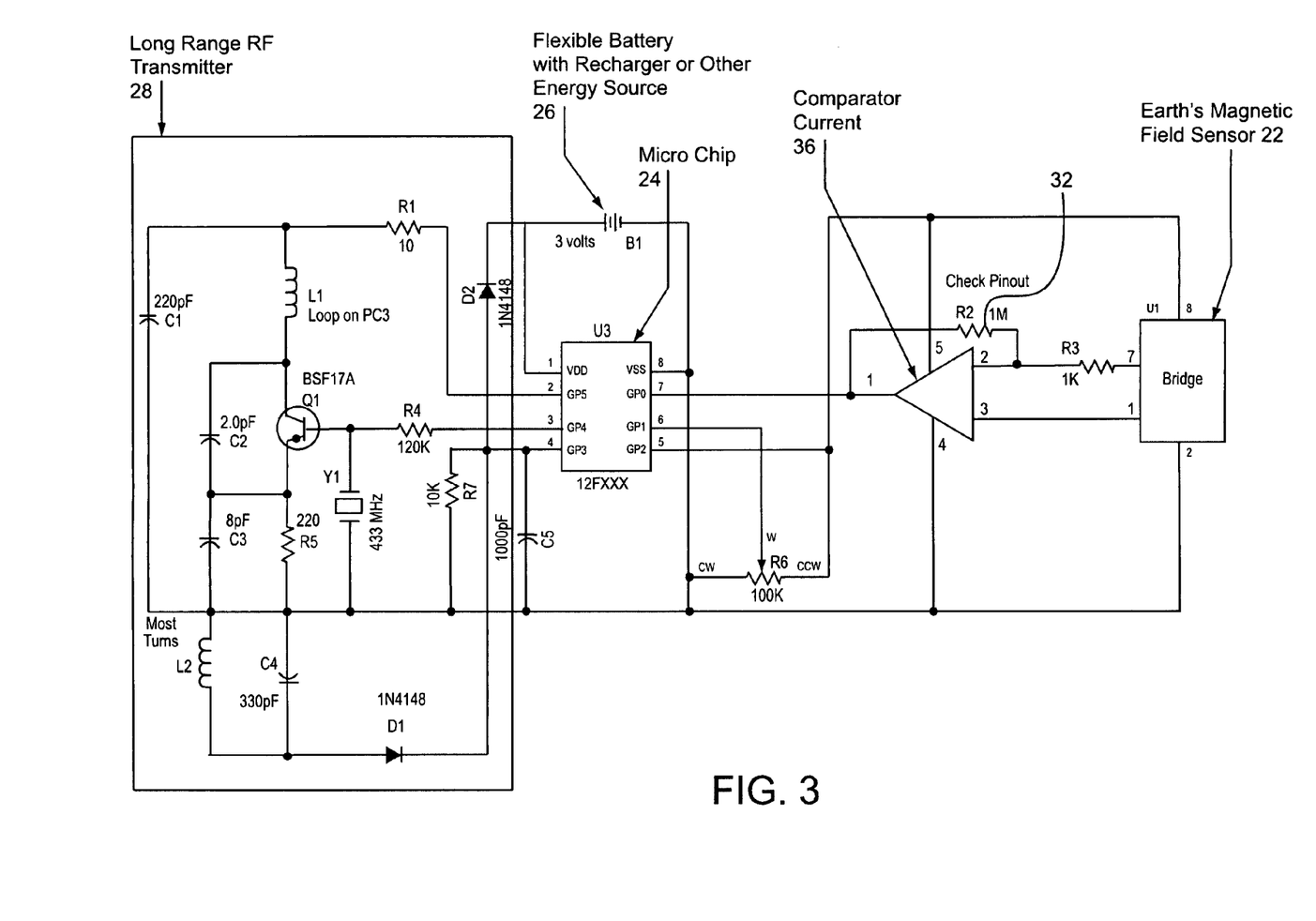
FIG. 3 is a wiring diagram of the RFID device of the present invention.

Referring to FIG. 3, there is shown a schematic of wiring diagram of the RFID device 20 of the present invention. As shown in FIG. 3 the magnetic sensor 22 (labeled "Bridge" in FIG. 3) senses the earth's magnetic field. The sensor 22 is connected to both (i) a comparator circuit 36 and operational amplifier and (ii) a potentionmeter 32 and acting therewith transmits comparison data to the microchip/memory processor 24. In contrast to many microchips which operate in the range of 8 milliamps, the microchip/memory processor 24 operates in the range of 1 pico-amp (i.e. 1 millionth of an amp). Power is provided by the energy source 26. The information received regarding the number of revolutions of the tire is then transmitted by the long range RF transmitter 28 to a remote receiving station.

Major features of the present invention include precise placement of the RFID device in the tire during manufacture, the utilization of a magnetic sensor for sensing the earth's magnetic field and, with other components mounted in a chip placed in a tire, the capability of counting the number of revolutions of the tire and transmitting that and other information to a remote location. Other features include:

1. An apparatus for the transmission of a radial location on a tire. External sensing of radial location on a tire is useful in the assembly and/or testing of a tire A device that could be used for such external sensing is an RFID transmitter, magnetic device, optical devices or other means of locating a radial position on a tire to improve quality or performance on the tire.

2. Long range transmission to assist in inventory and/or shipping.

3. An RFID transmitter providing a permanent serial number. The mileage of the tire may be obtained utilizing the earth's magnetic field and magnetic sensors to provide revolution count of the tire.

4. Utilization of a feature which develops electrical energy from mechanical energy (vibration of the tires) as a component of the RFID device.

The specific location of the RFID device or other information indicia for a given tire size and design may vary; however, once that location is determined for that specific tire size a design, it is important that, during the manufacturing operation, it be positioned in precisely that location in each tire manufactured of that size and design. This may be accomplished as shown in FIGS. 4 and 5.

Figure 4:
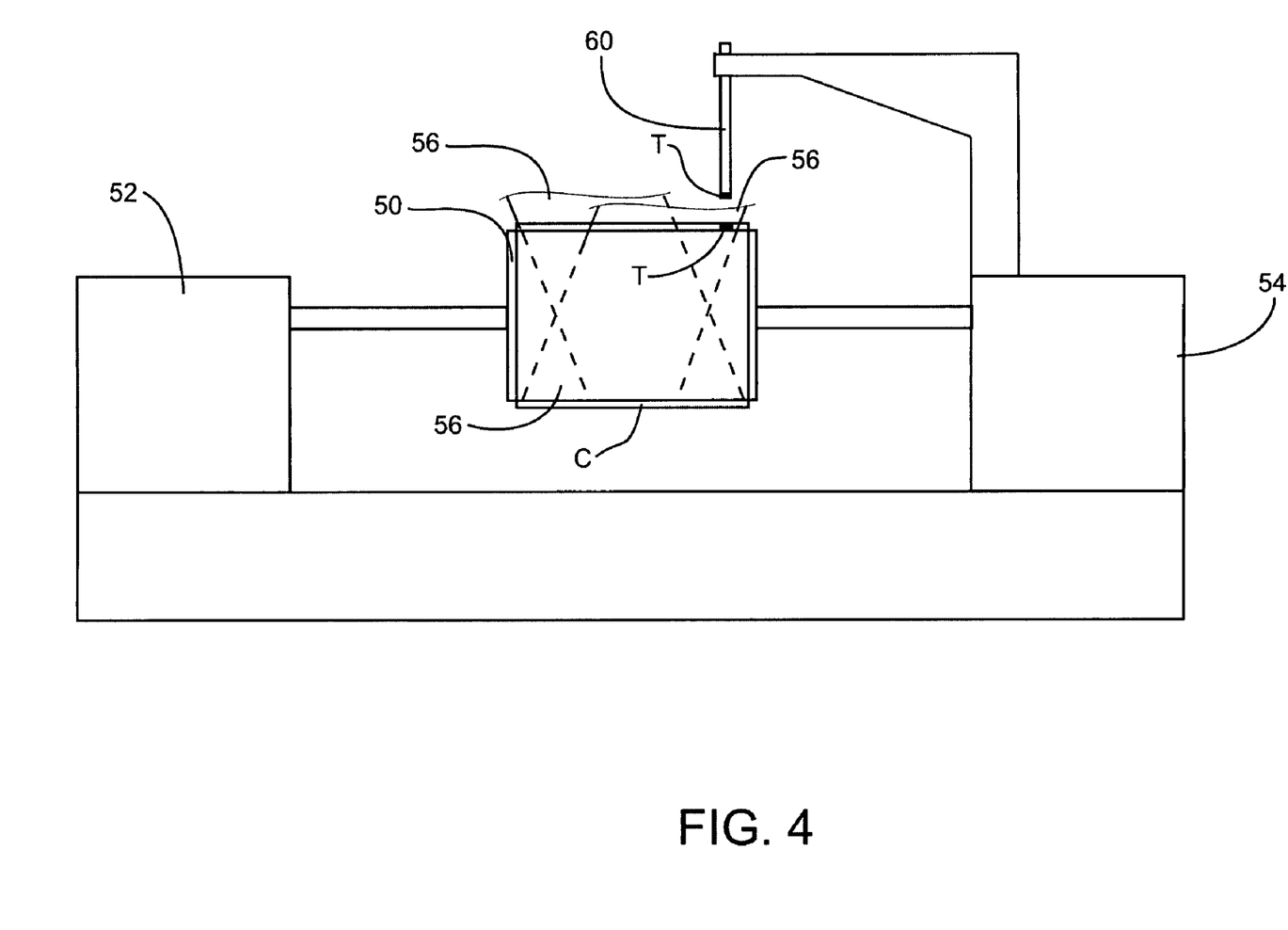
FIG. 4 is a schematic diagram showing placement of the RFID device on the carcass of the tire during the manufacturing process.

Referring to FIG. 4, there is shown apparatus utilized for the first stage of the building process of a tire. The carcass C of the tire is produced at the first stage and the equipment utilized therein includes a rotating drum 50 positioned between a head stack 52 and a tail stack 54. The drum 50 is rotated through the action of the head stack 52 and tail stack 54 and receives strips 56 of material for building a carcass C by winding as the drum 50 is rotated. At a predetermined point during the winding of the strips 56 for forming the carcass C, the drum 50 stops rotating and an RFID tag T is applied by an RFID stake-on applicator 60. The stake-on applicator 60 moves downwardly to affix the RFID tag T to the partially formed or, if desired, the completely formed carcass C. If the carcass C is only partially formed when the RFID tag T is applied, the drum will commence rotating to wind the strips 56 to completion of the carcass C.

Figure 5:
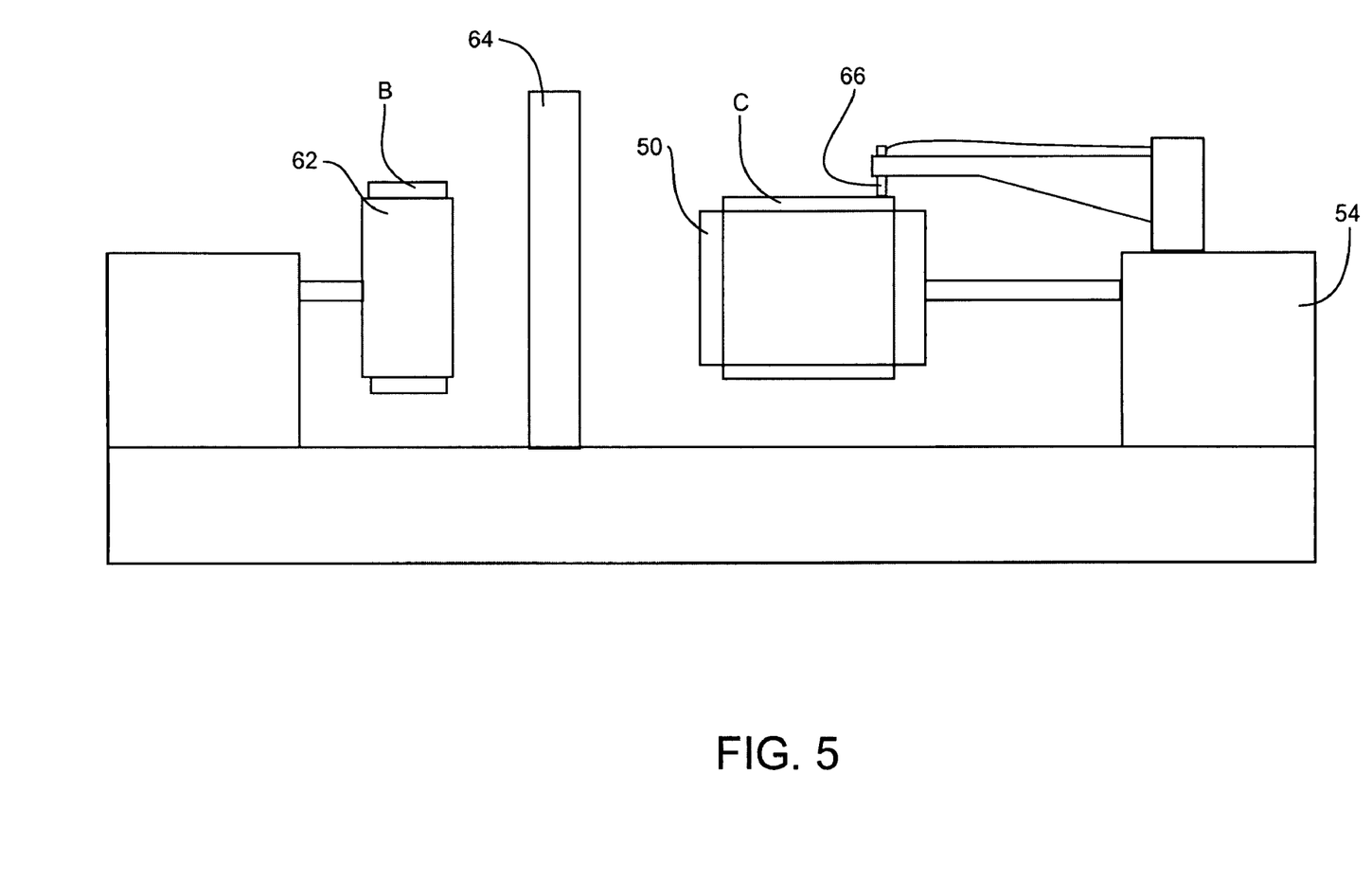
FIG. 5 is a schematic diagram showing another step in the manufacture of a tire according to the present invention.

Referring to FIG. 5 with the carcass C on the drum 50, a second stage process forms a tread band B on building drum 62 using procedures well known in the art. The band layer B has a larger internal diameter than the external diameter of the carcass C. It is transferred by a transfer mechanism 64 and telescoped over the carcass C. With the band layer B encircling the carcass C, the drum 50 carrying such carcass C is rotated until the RFID reader module 66 locates the RFID tag T. The location of the tag T by the RFID reader module 66 outputs to a computer which causes the drum 50 to stop rotating with the tag T located in the precise position desired. With the drum 50 stopped in a position with the RFID tag T of the carcass C underlying the RFID reader module 66, the band layer B is caused to be telescoped over the carcass C and to be rotated to a specified position with respect to the RFID tag T. Thereafter the drum 50 is caused to expand to expand the carcass C into sealing engagement with the band B thereby forming the second stage of the tire with the RFID tag T precisely at the position desired and in the same position on each addition tire of that size and specification manufactured thereafter.

Thereafter, the assembled carcass C and band layer are vulcanized by procedures well known in the art.

Figure 6:
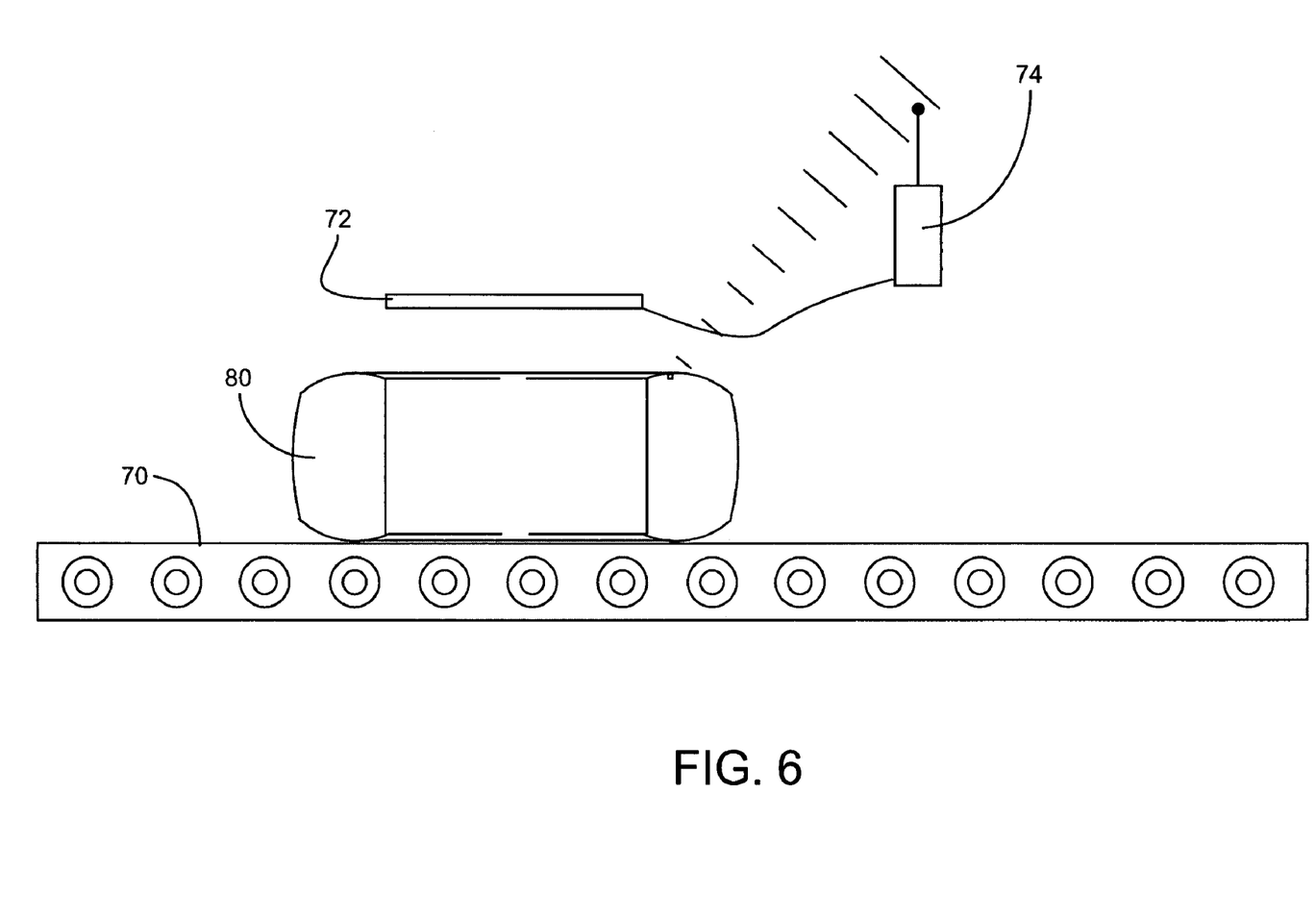
FIG. 6 is a schematic view showing a completed tire with the RFID device implanted therein being scanned by an RFID reader as it moves on a conveyor.

Referring to FIG. 6, there is shown a complete tire 80 moving on a conveyor 70. An excitation coil 72 is mounted above the conveyor 70 in a position above the tires and in a location for receiving datea from the RFID tags T mounted therein. The excitation coil 72 is connected to an RFID reader 74 which outputs the data to a computer. Among other data received by the computer are the serial numbers of the tires. As a result, it is possible to track each tire as it moves through the factory and to identify any which have been determined in the various testing procedures to have defects. Any such defective tires can then be readily located for remedial action or disposal.

Many modifications will be readily apparent to those skilled in the art. Accordingly, the scope of this application should be limited only by the scope of the claims.

I claim:

1. A radio frequency identification device (RFID) for a tire comprising:

(a) a sensor for sensing the earth's magnetic field, said sensor using the earth's magnetic field to obtain a count of tire rotation;

(b) a control logic selected from the group consisting of a microcontroller and PIC;

(c) a comparator circuit connecting sensor to said control logic;

(d) a radio frequency transmitter; and (e) power means.

2. The REID device according to claim 1 wherein said control logic transmits in the range of two to four milli amps.

3. The RFID device according to claim 1 wherein said power means is a battery.

4. The RFID device according to claim 1 wherein said power means is an electromagnetic device for converting the earth's magnetic field in to electrical energy.

5. A radio frequency identification device (RFID) for use in monitoring a tire comprising in combination (a) a sensor for sensing the earth's magnetic field, said sensor using the earth's magnetic field to obtain a count of tire rotation;

(b) a microcontroller;

(c) a comparator circuit including a first connector engaged to said sensor and a second connector engaged to the said microcontroller;

(d) a potentiometer acting with said comparator to transmit comparison data to said microcontroller; and (e) power means.

6. The RFID according to claim 5 wherein said microcontroller operates in the range of one pico amp.

7. The RFID according to claim 5 wherein said power means is a battery.

8. The RFID according to claim 5 wherein said power means is a electromagnetic device for converting vibration or road noise to electrical energy.

9. A method for positioning a radio frequency device (RFID) in each of a plurality tires during manufacture of said tires at a work station comprising the steps of (a) positioning one of a member of the group consisting of (i) an optical scanner, (ii) a magnetic scanner and (iii) reader for said RFID at a position for viewing or scanning said work station;

(b) causing said member to denote on each tire at said work station the precise location at which said RFID device should be positioned; and (c) affixing said RFID device on each successive tire at said location.

10. A method for positioning a Selected Targeted Device (STD) in each of a plurality of tires during manufacture comprising the steps of (a) affixing said STD to a partially completed tire;

(b) providing a reader at a work station for scanning said STD on said partially completed tire;

(c) causing said reader to denote on said partially completed tire at said work station the precise location at which STDs should be positioned on subsequently partially completed tires; and (d) affixing said STDs on each successive tire at said precise location.

11. The method of claim 10 wherein said STD is affixed to a carcass of said tire and further including the steps of (a) scanning the affixed STD periodically or continuously throughout the manufacturing process, (b) thereafter positioning a band layer over said carcass and (c) expanding carcass into contact with the interior surface of said band layer.

12. The method of claim 11 further including the step of imparting rotational movement of said band layer relative to said carcass prior to said step of expanding said carcass.

13. A method for affixing RFID devices in tires during manufacture comprising the steps of (a) determining a desired location on said tires for receiving said device;

(b) forming at least part of a carcass of said tire on a first rotatable drum, said carcass having an outer circumference defining a circle having a diameter;

(c) providing an affixing mechanism for affixing said device to said carcass, said mechanism overlying said drum;

(d) stopping rotation of said drum when the desired location for placement of said device is positioned to receive said device from said affixing mechanism;

(e) actuating said affixing mechanism to affix said device to said carcass or partially formed carcass at said desired location;

(f) winding strips of material on said second drum to form a band layer of said tire, said band layer defining a torus having an inner size permitting said carcass to be positioned therein;

(g) providing relative movement between said carcass and said band layer to position said carcass in said band layer; and (h) expanding said carcass into engagement with said band layer.

14. A radio frequency identification device (RFID) for a tire comprising:

(a) a sensor for sensing the earth's magnetic field said sensor using the earth's magnetic field to obtain a count of tire rotation;

(b) a control logic selected from the group consisting of a microcontroller and PIC;

(c) a comparator circuit connecting said sensor to said control logic;

(d) a radio frequency transmitter; and (e) power means of an electromagnetic device for converting the earth's magnetic field in to electrical energy.

15. The RFID device according to claim 14 wherein said control logic transmits in the range of two to four milli amps.

16. A radio frequency identification device (RFID) for use in monitoring a tire comprising in combination (a) a sensor for sensing the earth's magnetic field, said sensor using the earth's magnetic field to obtain a count of tire rotation;

(b) a microcontroller;

(c) a comparator circuit including a first connector engaged to said sensor and a second connector engaged to the said microcontroller;

(d) a potentiometer acting with said comparator to transmit comparison data to said microcontroller; and (e) power means comprising an electromagnetic device for converting the earth's magnetic field in to electrical energy.

17. The RFID according to claim 16 wherein said microcontroller operates in the range of one pico amp.

* * * * *

UNITED STATES PATENT AND TRADEMARK OFFICE
CERTIFICATE OF CORRECTION

| | |
|---|---|
| PATENT NO. | : 7,504,947 B2 |
| APPLICATION NO. | : 11/408466 |
| DATED | : March 17, 2009 |
| INVENTOR(S) | : Randall L. Tucker |

Page 1 of 1

It is certified that error appears in the above-identified patent and that said Letters Patent is hereby corrected as shown below:

In column 5, line 7, please replace "REID" with -- RFID --.

Signed and Sealed this

Nineteenth Day of May, 2009

JOHN DOLL
*Acting Director of the United States Patent and Trademark Office*